United States Patent
Venkumahanti et al.

(10) Patent No.: US 9,715,392 B2
(45) Date of Patent: Jul. 25, 2017

(54) MULTIPLE CLUSTERED VERY LONG INSTRUCTION WORD PROCESSING CORE

(71) Applicant: QUALCOMM Incorporated, San Diego, CA (US)

(72) Inventors: Suresh Kumar Venkumahanti, Austin, TX (US); Ankit Ghiya, Austin, TX (US); Peter Gene Sassone, Austin, TX (US); Lucian Codrescu, Austin, TX (US); Suman Mamidi, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 14/473,947

(22) Filed: Aug. 29, 2014

(65) Prior Publication Data
US 2016/0062770 A1 Mar. 3, 2016

(51) Int. Cl.
G06F 9/38 (2006.01)

(52) U.S. Cl.
CPC .......... *G06F 9/3885* (2013.01); *G06F 9/3851* (2013.01); *G06F 9/3853* (2013.01); *G06F 9/3891* (2013.01)

(58) Field of Classification Search
CPC .... G06F 9/3885; G06F 9/3851; G06F 9/3853; G06F 9/3891
See application file for complete search history.

(56) References Cited

U.S. PATENT DOCUMENTS

| | | | | |
|---|---|---|---|---|
| 5,574,939 A | * | 11/1996 | Keckler | G06F 9/30032 712/200 |
| 6,148,395 A | * | 11/2000 | Dao | G06F 9/3885 712/220 |
| 6,615,338 B1 | | 9/2003 | Tremblay et al. | |
| 6,725,354 B1 | * | 4/2004 | Kahle | G06F 9/3017 712/222 |
| 7,035,998 B1 | | 4/2006 | Nemirovsky et al. | |
| 7,117,389 B2 | * | 10/2006 | Luick | G06F 11/2028 714/10 |
| 8,412,917 B2 | | 4/2013 | Khailany et al. | |
| 8,423,716 B2 | | 4/2013 | LaTorre et al. | |
| 8,423,750 B2 | | 4/2013 | Hall et al. | |

(Continued)

FOREIGN PATENT DOCUMENTS

WO 9427216 A1 11/1994

OTHER PUBLICATIONS

El-Moursy et al., "Partitioning Multi-Threaded Processors with a Large Number of Threads," Mar. 2005, IEEE International Symposium on Performance Analysis of Systems and Software, ISPASS 2005, pp. 112-123.*

(Continued)

*Primary Examiner* — Yuqing Xiao
(74) *Attorney, Agent, or Firm* — Qualcomm Incorporated-Toi

(57) ABSTRACT

A method includes identifying, at a scheduling unit, a resource conflict at a shared processing resource that is accessible by a first processing cluster and by a second processing cluster, where the first processing cluster, the second processing cluster, and the shared processing resource are included in a very long instruction word (VLIW) processing unit. The method also includes resolving the resource conflict.

24 Claims, 5 Drawing Sheets

(56) References Cited

U.S. PATENT DOCUMENTS

| | | |
|---|---|---|
| 2002/0069345 A1 | 6/2002 | Mohamed et al. |
| 2009/0172359 A1* | 7/2009 | Shen .................... G06F 9/3822 712/215 |
| 2012/0089812 A1 | 4/2012 | Smith |
| 2014/0019803 A1 | 1/2014 | Busaba et al. |

OTHER PUBLICATIONS

Keckler et al., "Exploiting Fine-Grain Thread Level Parallelism on the MIT Multi-ALU Processor," Jun. 1998, ISCA '98 Proceedings of the 25th annual international symposium on Computer architecture, pp. 306-317.*

"Bulldozer (microarchitecture)," Wikipedia, http://en.wikipedia.org/wiki/Bulldozer_(microarchitecture), retrieved Jan. 9, 2014, 9 pages.

"Itanium," Wikipedia, http://en.wikipedia.org/wiki/Itanium, retrieved Jan. 9, 2014, 14 pages.

International Search Report and Written Opinion for International Application No. PCT/US2015/041725, ISA/EPO, Date of Mailing Oct. 8, 2015, 9 pages.

* cited by examiner

MULTIPLE CLUSTERED VERY LONG INSTRUCTION WORD PROCESSING CORE

I. FIELD

The present disclosure is generally related to a multiple clustered very long instruction word (VLIW) processing core.

II. DESCRIPTION OF RELATED ART

Advances in technology have resulted in smaller and more powerful computing devices. For example, there currently exist a variety of portable personal computing devices, including wireless telephones such as mobile and smart phones, tablets, and laptop computers, that are small, lightweight, and easily carried by users. These devices can communicate voice and data packets over wireless networks. Further, many such devices incorporate additional functionalities such as a digital still camera, a digital video camera, a digital recorder, and an audio file player. Also, such devices can process executable instructions, including software applications, such as a web browser application, that can be used to access the Internet. As such, these devices can include significant computing capabilities.

Wireless telephones may include processors that execute instructions to perform a variety of operations (e.g., encoding, decoding, multimedia processing, etc.). Instruction-level parallelism may improve processor performance by enabling a processor to concurrently execute multiple instructions. To illustrate, a compiler may identify multiple instructions of a program that can be executed in parallel. The compiler may group the multiple instructions within a very long instruction word (VLIW) instruction packet. The processor may execute the multiple instructions of the VLIW instruction packet in parallel at multiple execution units, which may improve performance as compared to serially executing the multiple instructions.

Simultaneous multithreading (SMT) may also improve processor performance. For example, in an SMT VLIW configuration, a processor may concurrently execute multiple instructions of a first thread and multiple instructions of a second thread. However, such a configuration may inefficiently use hardware processing resources. For example, a first execution pipeline for executing the first thread may include a first hardware processing resource that is rarely used and a second execution pipeline for executing the second thread may include a second hardware processing resource that is rarely used. Having a rarely used hardware processing resource in each execution pipeline may consume a relatively large amount of die area and power.

III. SUMMARY

In a particular aspect, an apparatus includes a very long instruction word (VLIW) processing unit. The VLIW processing unit includes a first processing cluster, a second processing cluster, and a shared processing resource that is accessible by the first processing cluster and by the second processing cluster. The apparatus also includes a scheduling unit configured to resolve a resource conflict at the shared processing resource, where the resource conflict is detected when a first instruction associated with the first processing cluster and a second instruction associated with the second processing cluster are scheduled for concurrent execution by the shared processing resource. The apparatus also includes a memory coupled to the VLIW processing unit.

In another particular aspect, a method includes identifying, at a scheduling unit, a resource conflict at a shared processing resource that is accessible by a first processing cluster and by a second processing cluster, where the first processing cluster, the second processing cluster, and the shared processing resource are included in a very long instruction word (VLIW) processing unit. The method also includes resolving the resource conflict.

In another aspect, an apparatus includes means for executing a first set of instructions of a first very long instruction word (VLIW) instruction packet. The apparatus also includes means for executing a second set of instructions of a second VLIW instruction packet. The apparatus further includes means for selectively executing a first instruction of the first set of instruction or a second instruction of the second set of instructions. The apparatus further includes means for identifying a resource conflict between the first VLIW instruction packet and the second VLIW instruction packet and for scheduling a third VLIW instruction packet for execution in parallel with either the first VLIW instruction packet or the second VLIW instruction packet in response to identifying the resource conflict. The means for executing a first set of instruction is within a first VLIW processing cluster. The means for executing a second set of instructions is within a second VLIW processing cluster. The means for selectively executing is accessible by the first VLIW processing cluster and the second VLIW processing cluster.

In another aspect, a non-transitory computer-readable medium stores very long instruction word (VLIW) instruction packets generated by a compiler. The VLIW instruction packets include indications associated with resource scheduling such that when the VLIW instruction packets are executed by a processor, the indications cause the processor to detect a resource conflict between a first instruction of a first VLIW instruction packet and a second instruction of a second VLIW instruction packet at a shared processing resource. The resource conflict is detected when the first instruction and the second instruction are scheduled for concurrent execution by the shared processing resource. The indications also cause the processor to resolve the resource conflict.

One particular advantage provided by at least one of the disclosed aspects is improved utilization of hardware processing resources to reduce die area and power consumption. For example, relatively complex hardware processing resources and/or rarely used hardware processing resources may be shared by multiple processing clusters to reduce die area and power consumption. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
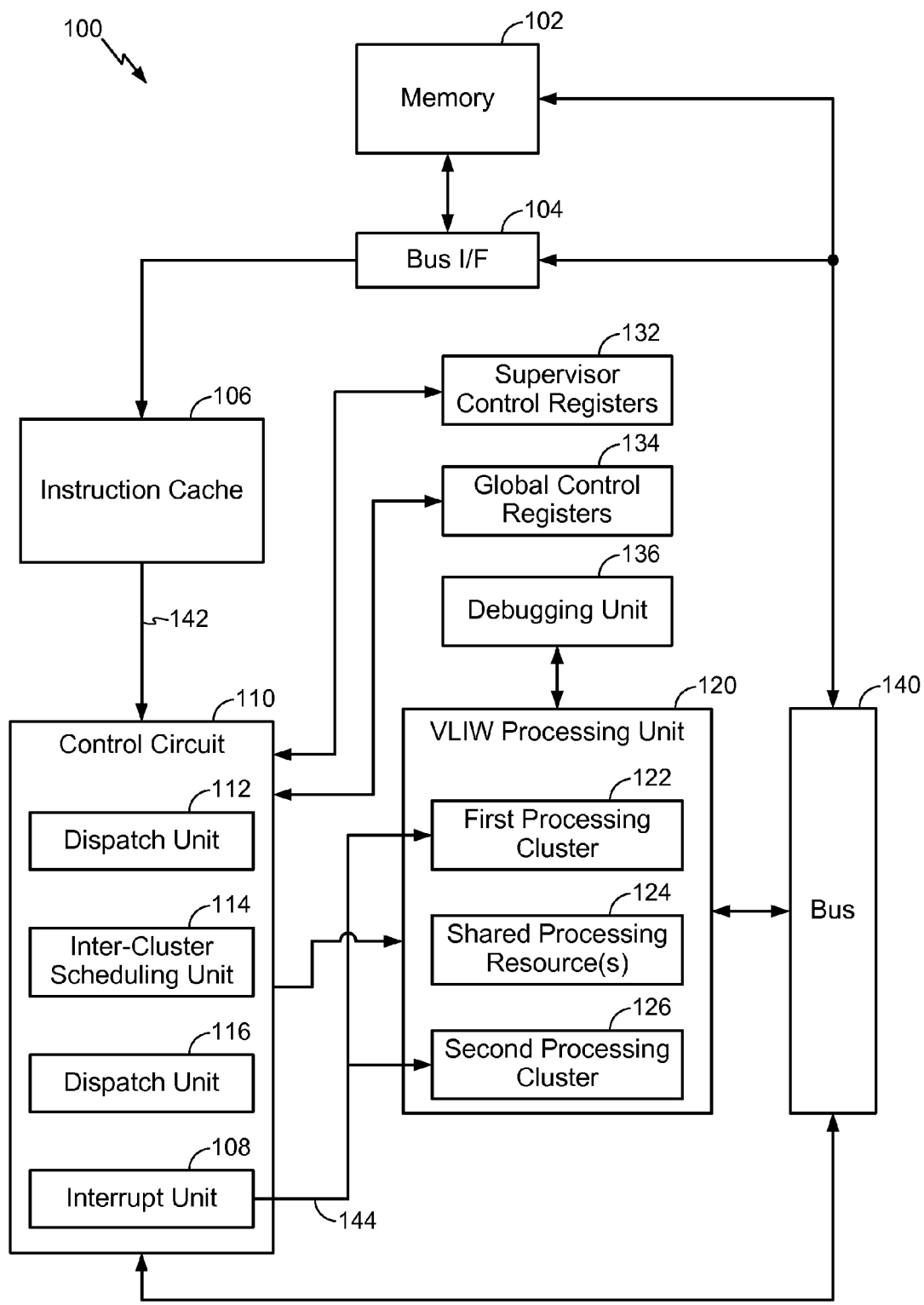
FIG. 1 is a diagram of a particular illustrative aspect of a system that is operable to process very long instruction word (VLIW) instruction packets using multiple processing clusters.

Referring to FIG. 1, a particular illustrative aspect of a system 100 that is operable to process very long instruction word (VLIW) instruction packets using multiple processing clusters is shown. The system 100 may include a memory 102, an instruction cache 106, a control circuit 110, and a VLIW processing unit 120. In a particular aspect, all or a portion of the system 100 may be integrated into a processor.

The memory 102 may be coupled to the instruction cache 106 via a bus interface (Bus I/F) 104. One or more VLIW instruction packets may be provided to the instruction cache 106 from the memory 102 via the bus interface 104, and the instruction cache 106 may store the one or more VLIW instruction packets. Each VLIW instruction packet may include a set of instructions that are executed in parallel to increase processing speed. As a non-limiting example, each VLIW instruction packet may include four instructions that are executed in parallel.

The instruction cache 106 may be coupled to a control circuit 110 via a first bus 142. The control circuit 110 may include a first dispatch unit 112, an inter-cluster scheduling unit 114, a second dispatch unit 116, and an interrupt unit 108. The control circuit 110 may be coupled to the VLIW processing unit 120. The VLIW processing unit 120 may include a first processing cluster 122 (e.g., a VLIW processing cluster), a second processing cluster 126 (e.g., a VLIW processing cluster), and one (or more) shared processing resource(s) 124. For example, the shared processing resource(s) 124 may be accessible by the first processing cluster 122 and by the second processing cluster 126. A particular shared processing resource 124 may execute a first instruction associated with the first processing cluster 122 at a first time (e.g., during a first processing cycle) and execute a second instruction associated with the second processing cluster 126 at a second time (e.g., during a second processing cycle). For example, based on scheduling by the inter-cluster scheduling unit 114 (as described below), the particular shared processing resource 124 may receive the first instruction from the first processing cluster 122 during the first processing cycle and may receive the second instruction from the second processing cluster 126 during the second processing cycle.

In a particular aspect, power gating techniques may be applied to the shared processing resources 124. For example, the control circuit 110 may issue a power down command to power down the shared processing resources 124 in response to a determination that there are no instructions scheduled for execution by the processing resources 124. The control circuit 110 may issue the power down command based on instructions provided to the processing clusters 122, 126 and/or based on other instructions. Powering down one or more of the shared processing resources 124 during an idle period may conserve battery power.

In a particular aspect, the shared processing resources 124 may include relatively complex resources that are used less frequently than processing resources within the processing clusters 122, 126. For example, the shared processing resources 124 may include multiplication units or floating point arithmetic units. The VLIW processing unit 120 may be a simultaneous multithreaded (SMT) VLIW processor.

For example, the first processing cluster 122 and the second processing cluster 126 may be configured to simultaneously execute instructions (e.g., instructions retrieved from the instruction cache 106). In another aspect, the VLIW processing unit 120 may correspond to a single VLIW processing core that accesses the instruction cache 106 via the control circuit 110.

During operation, the instruction cache 106 may provide the VLIW instruction packets to the inter-cluster scheduling unit 114 via the first bus 142. The inter-cluster scheduling unit 114 may be configured to identify resource conflicts between the VLIW instruction packets. A resource conflict may arise when a first instruction of a first VLIW instruction packet and a second instruction of a second VLIW instruction packet are scheduled for execution by the same shared processing resource 124 at the same time. To illustrate, if the first VLIW instruction packet (including the first instruction) is scheduled to be executed via the first processing cluster 122 at the same time that the second VLIW instruction packet (including the second instruction) is scheduled to be executed via the second processing cluster 126, the inter-cluster scheduling unit 114 may determine whether the shared processing resource 124 (accessible by both processing clusters 122, 126) is scheduled to execute the first instruction and the second instruction at the same time. In a particular aspect, the resource conflict may arise based on scheduling by a compiler (not shown). For example, the first instruction and the second instruction may be scheduled for execution by a compiler prior to being received at the inter-cluster scheduling unit 114.

In response to identifying the resource conflict, the inter-cluster scheduling unit 114 may reschedule either the first VLIW instruction packet or the second VLIW instruction packet and schedule a different VLIW instruction packet (in the place of the rescheduled packet) that does not include an instruction to be executed by the shared processing resource 124. For example, a third VLIW instruction packet may be scheduled to be executed in parallel with the first VLIW instruction packet or the second VLIW instruction packet. The inter-cluster scheduling unit 114 may schedule VLIW instruction packets (or reschedule the VLIW instruction packets previously scheduled by the compiler) for execution by providing the VLIW instruction packets to the dispatch unit(s) 112, 116. For example, the inter-cluster scheduling unit 114 may schedule the first VLIW instruction packet for execution by the first processing cluster 122 by providing the first VLIW instruction packet to the first dispatch unit 112, and the first dispatch unit 112 may dispatch the first VLIW instruction packet to the first processing cluster 122. In a similar manner, the inter-cluster scheduling unit 114 may schedule the second VLIW instruction packet for execution by the second processing cluster 126 by providing the second VLIW instruction packet to the second dispatch unit 116, and the second dispatch unit 116 may dispatch the second VLIW instruction packet to the second processing cluster 126.

The control circuit 110 may also be coupled to one or more supervisor control registers 132 and to one or more global control registers 134. In a particular aspect, the supervisor control registers 132 and the global control registers 134 may store bits that may be accessed by the interrupt unit 108 to determine whether to accept interrupts (e.g., general interrupts). The interrupt unit 108 may control (e.g., override) execution of instructions. For example, the first processing cluster 122 and the second processing cluster 126 may be responsive to a common interrupt signal generated by the interrupt unit 108. To illustrate, the interrupt unit 108 may transmit a common interrupt signal 144 to the first processing cluster 122 or to the second processing cluster 126 to discontinue execution of instructions within the first processing cluster 122 or the second processing cluster 126, respectively. In a particular aspect, execution of the VLIW instruction packets by the first processing cluster 122 and the second processing cluster 126 may be discontinued in response to receiving an interrupt signal from the interrupt unit 108. The common interrupt signal 144 may be generated based on the stored bits in the supervisor control registers 132 and/or stored bits in the global control registers 134. Thus, the first processing cluster 122 and the second processing cluster 126 may be responsive to bits stored in the global control registers 134 and/or the supervisor control registers 132.

A debugging unit 136 may also be coupled to the VLIW processing unit 120. The first processing cluster 122 and the second processing cluster 126 may be responsive to the debugging unit 136. For example, the debugging unit 136 may be configured to detect and/or remove errors from the first processing cluster 122 and the second processing cluster 126 (e.g., debug the first processing cluster 122 and the second processing cluster 126).

The VLIW processing unit 120 may be coupled to provide data to the memory 102 via a second bus 140. As described in greater detail with respect to FIG. 2, the processing clusters 122, 126 may share a level one (L1) data cache to improve data coherency between the processing clusters 122, 126. Data stored in the L1 data cache may be provided to the memory 102 via the second bus 140.

The system 100 of FIG. 1 may reduce die area and power consumption by having shared processing resources 124 that are accessible to multiple processing clusters 122, 126. For example, the shared processing resources 124 may include processing resources that are complex and/or rarely used. Thus, instead of including these complex resources in the first processing cluster 122 and the second processing cluster 126 (e.g., having multiple complex resources), the complex resources may be shared (e.g., accessible) by each processing cluster 122, 126 to reduce die area. Reduction of these complex resources may also reduce power consumption of the system 100.

It should be noted that the system 100 depicted in FIG. 1 is for example only. The disclosed techniques may be supported by and executed within other architectures (e.g., micro-architectures and digital signal processor (DSP) architectures). For example, an alternate architecture may include more, fewer, and/or different components than the system 100 of FIG. 1.

Figure 2:
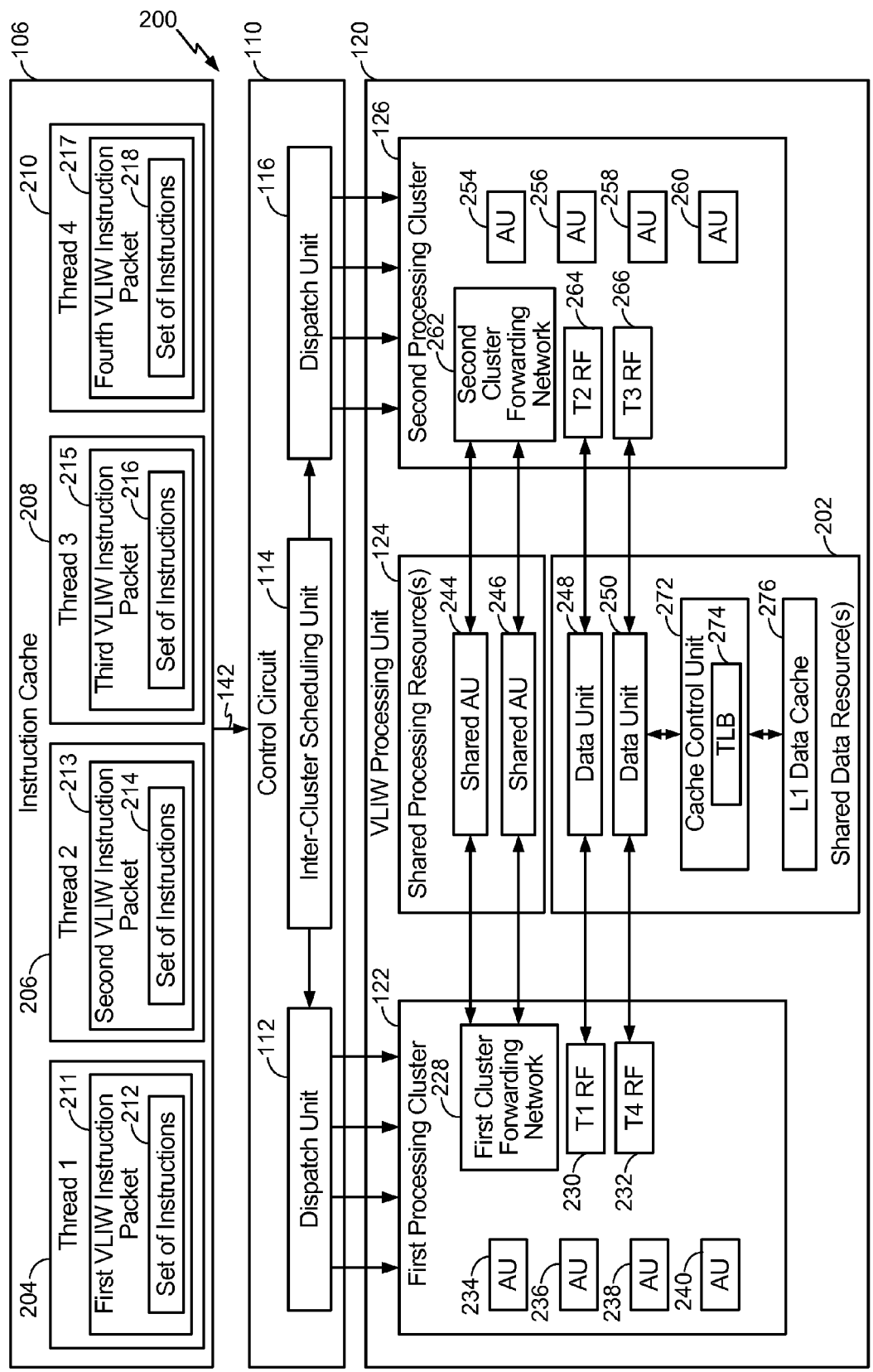
FIG. 2 is a diagram of a particular illustrative aspect of a processing system that is operable to process VLIW instruction packets using multiple processing clusters.

Referring to FIG. 2, a particular illustrative aspect of a processing system 200 that is operable to process very long instruction word (VLIW) instruction packets using multiple processing clusters is shown. The processing system 200 may include the instruction cache 106, the control circuit 110, and the VLIW processing unit 120.

The instruction cache 106 may store multiple VLIW instruction packets. In the illustrated aspect, the instruction cache 106 may store a first VLIW instruction packet 211 that includes or corresponds to a first set of instructions 212, a second VLIW instruction packet 213 that includes or corresponds to a second set of instructions 214, a third VLIW instruction packet 215 that includes or corresponds to a third set of instructions 216, and a fourth VLIW instruction packet 217 that includes or corresponds to a fourth set of instructions 218. The first VLIW instruction packet 211 may be associated with a first thread 204 (e.g., Thread 1), the second VLIW instruction packet 213 may be associated with a second thread 206 (e.g., Thread 2), the third VLIW instruction packet 215 may be associated with a third thread 208 (e.g., Thread 3), and the fourth VLIW instruction packet 217 may be associated with a fourth thread 210 (e.g., Thread 4). In a particular aspect, each set of instructions 212, 214, 216, 218 may include four instructions. The VLIW instruction packets 211, 213, 215, 217 may be provided to the control circuit 110 via the first bus 142.

The VLIW processing unit 120 may include the first processing cluster 122, the second processing cluster 126, the shared processing resources 124, and one or more shared data resources 202. The first processing cluster 122 may include a register file (T1 RF) 230 associated with the first thread 204, a register file (T4 RF) 232 associated with the fourth thread 210, a first cluster forwarding network 228, and multiple execution units, such as arithmetic units (AUs) 234-240. The first cluster forwarding network 228 may be configured to forward instructions (assigned by the inter-cluster scheduling unit 114) to the arithmetic units 234-240. Although the first processing cluster 122 depicts the first cluster forwarding network 228, in other embodiments, the first cluster forwarding network 228 may be absent from the first processing cluster 122 and the control circuit 110 (e.g., the inter-cluster scheduling unit 114) may forward instructions to the arithmetic units 234-240. The arithmetic units 234-240 may be configured to execute the instructions forwarded by the first cluster forwarding network 228. The second processing cluster 126 may include a register file (T2 RF) 264 associated with the second thread 206, a register file (T3 RF) 266 associated with the third thread 208, a second cluster forwarding network 262, and multiple execution units, such as arithmetic units 254-260. The second cluster forwarding network 262 may be configured to forward instructions (assigned by the inter-cluster scheduling unit 114) to the arithmetic units 254-260. Although the second processing cluster 126 depicts the second cluster forwarding network 262, in other embodiments, the second cluster forwarding network 262 may be absent from the second processing cluster 126 and the control circuit 110 may forward instructions to the arithmetic units 254-260. The arithmetic units 254-260 may be configured to execute the instructions forwarded by the second cluster forwarding network 262.

The shared processing resources 124 may include a first shared arithmetic unit 244 and a second shared arithmetic unit 246. In a particular aspect, the shared arithmetic units 244, 246 may be multiplication units or floating point arithmetic units. The first shared arithmetic unit 244 may be coupled to the first cluster forwarding network 228 and to the second cluster forwarding network 262. The second shared arithmetic unit 246 may be coupled to the first cluster forwarding network 228 and to the second cluster forwarding network 262.

The shared data resources 202 may include a first data unit 248, a second data unit 250, a cache control unit 272, and a shared level one (L1) data cache 276. The data units 248, 250 may enable interfacing between the processing clusters 122, 126 and the L1 data cache 276. For example, the data units 248, 250 may be coupled to the register files 230, 232 of the first processing cluster 122 and to the register files 264, 266 of the second processing cluster 126. The data units 248, 250 may also be coupled to the cache control unit 272. Data from the processing clusters 122, 126 (e.g., data stored in the register files 230, 232, 264, 266) may be provided to the L1 data cache 276 via the data units 248, 250 and to the cache control unit 272. To illustrate, the cache control unit 272 may include a translation lookaside buffer (TLB) 274.

The TLB 274 may be accessible (e.g., visible) to the first processing cluster 122 and to the second processing cluster 126 via the data units 248, 250. For example, to store data from the first processing cluster 122 and/or the second processing cluster 126 into the L1 data cache 276, the cache control unit 272 may access the TLB 274 to translate virtual addresses into physical addresses of the L1 data cache 276.

During operation, the processing clusters 122, 126 may simultaneously execute instructions according to a simultaneous multithreading (SMT) technique. For example, the inter-cluster scheduling unit 114 may provide VLIW instruction packets to the first dispatch unit 112 and the second dispatch unit 116. The first dispatch unit 112 may provide a set of instructions (e.g., the first set of instructions 212 or the fourth set of instructions 218) to the first processing cluster 122, and the second dispatch unit 116 may provide a set of instructions (e.g., the second set of instructions 214 or the third set of instructions 216) to the second processing cluster 126. As an illustrative non-limiting example, each set of instructions 212-218 may include four instructions. Thus, the first dispatch unit 112 and the second dispatch unit 116 may each include four ports (e.g., a port for each instruction) to provide a set of instructions to the first processing cluster 122 and to the second processing cluster 126, respectively. The first processing cluster 122 may execute the first set of instructions 212 or the fourth set of instructions 218 while the second processing cluster 126 simultaneously executes the second set of instructions 214 or the third set of instructions 216.

The shared processing resources 124 may also execute specific instructions. For example, during a first processing cycle, the first shared arithmetic unit 244 may execute a first instruction of the first set of instructions 212. To illustrate, the inter-cluster scheduling unit 114 may provide the first VLIW instruction packet 211 to the first dispatch unit 112 during the first processing cycle. The first dispatch unit 112 may provide the first set of instructions 212 (included in the first VLIW instruction packet 211) to the first cluster forwarding network 228, and the first cluster forwarding network 228 may provide the first instruction of the first set of instructions 212 to the first shared arithmetic unit 244 for processing. During a second processing cycle, the first shared arithmetic unit 244 may execute a second instruction of the second set of instructions 214. To illustrate, the inter-cluster scheduling unit 114 may provide the second VLIW instruction packet 213 to the second dispatch unit 116 during the second processing cycle. The second dispatch unit 116 may provide the second set of instructions 214 (included in the second VLIW instruction packet 213) to the second cluster forwarding network 262, and the second cluster forwarding network 262 may provide the second instruction of the second set of instructions 214 to the first shared arithmetic unit 244 for processing.

It should be noted that although the first processing cluster 122 is shown to execute the first set of instructions 212 and the fourth set of instructions 218, in other aspects, the first processing cluster 122 may execute any set of instructions 212-218. In a similar manner, although the second processing cluster 126 is shown to execute the second set of instructions 214 and the third set of instructions 216, in other aspects, the second processing cluster 126 may execute any set of instructions 212-218. For example, as described below, each set of instructions 212-218 may be assigned to a processing cluster 122, 126 based on resource conflicts associated with the shared processing resources 124.

The inter-cluster scheduling unit 114 may be configured to identify resource conflicts between multiple VLIW instruction packets 211, 213, 215, 217. To illustrate, if the first processing cluster 122 is to execute the first set of instructions 212 (e.g., the first VLIW instruction packet 211) and the second processing cluster 126 is to simultaneously execute the second set of instructions 214 (e.g., the second VLIW instruction packet 213), the inter-cluster scheduling unit 114 may analyze each set of instructions 212, 214 to determine whether each set of instructions 212, 214 includes an instruction targeting a particular shared processing resource 124. For example, if the first set of instructions 212 includes a first instruction targeting the first shared arithmetic unit 244 and the second set of instructions 214 includes a second instruction targeting the first shared arithmetic unit 244, then the inter-cluster scheduling unit 114 may identify that a resource conflict exists between the first VLIW instruction packet 211 and the second VLIW instruction packet 213.

The inter-cluster scheduling unit 114 may be configured to schedule a different set of instructions (e.g., a different VLIW instruction packet) in one of the processing clusters 122, 126 to circumvent the resource conflict. For example, the inter-cluster scheduling unit 114 may be configured to schedule the third set of instructions 216 associated with the third VLIW instruction packet 215 for execution in parallel with either the first set of instructions 212 or the second set of instructions 214 in response to identifying the resource conflict. If the inter-cluster scheduling unit 114 determines that no resource conflict exists between the first set of instructions 212 and the third set of instructions 216, the inter-cluster scheduling unit 114 may schedule the first set of instructions 212 and the third set of instructions 216 for concurrent execution at the first and second processing clusters 122, 126, respectively. If the inter-cluster scheduling unit 114 determines that no resource conflict exists between the first set of instructions 212 and the fourth set of instructions 218, the inter-cluster scheduling unit 114 may schedule the first set of instructions 212 and the fourth set of instructions 216 for concurrent execution at the first and second processing clusters 122, 126, respectively.

In a particular aspect, the inter-cluster scheduling unit 114 may be configured to schedule execution of instructions of a less recently used thread sooner than execution of instructions of a more recently used thread. For example, if neither the third set of instructions 216 or the fourth set of instructions 218 presents a resource conflict with the first set of instructions 212, then the inter-cluster scheduling unit 114 may select the third set of instructions 216 in response to determining that the third thread 208 is less recently used than the fourth thread 210.

The processing system 200 may enable efficient allocation of resources of a VLIW architecture. For example, by using multiple processing clusters 122, 126, an SMT design employing multiple threads may be implemented at the processing system 200 to increase processing efficiency as compared to single-threaded processing systems. Further, by sharing at least one shared processing resource 124 among the processing clusters 122, 126, die area consumption and the number of hardware resources in the processing system 200 may be reduced. To illustrate, a floating point unit (e.g., a shared arithmetic unit 244, 246) may be complex and consume a large die area. The probability of a single thread using the floating point unit during a particular execution cycle may be relatively low. However, the probability a single thread of multiple threads using the floating point unit during a particular execution cycle may be relatively high. Accordingly, by allocating a floating point unit as a shared resource between the processing clusters 122, 126, resource allocation efficiency may increase, while die area consumption and cost decrease.

In addition, the inter-cluster scheduling unit 114 may avoid resource conflicts by scheduling threads such that simultaneously executed threads do not attempt to concurrently access the same shared processing resource 124. Thus, the inter-cluster scheduling unit 114 may analyze the contents of the threads 204-210 at "run-time" (as opposed to a compiler that groups the instructions 212-218 prior to run-time) to determine whether a resource conflict exists.

It will be appreciated that the shared data cache (e.g., the L1 data cache 276) may increase data coherency between the processing clusters 122, 126. For example, writing data to the shared L1 data cache 276 may reduce the likelihood that a processing cluster 122, 126 (or other processing element) reads "stale" data from a data cache. Although the processing system 200 of FIG. 2 includes a single VLIW processing core (e.g., a single VLIW processing unit that includes a single data cache), the multiple processing cluster hierarchy of FIG. 2 enables certain performance benefits of a conventional multi-core processor. For example, the multiple processing cluster hierarchy enables the processing system 200 to execute common instructions using resources in parallel pipelines while executing less commonly-used instructions using shared resources.

Figure 3:
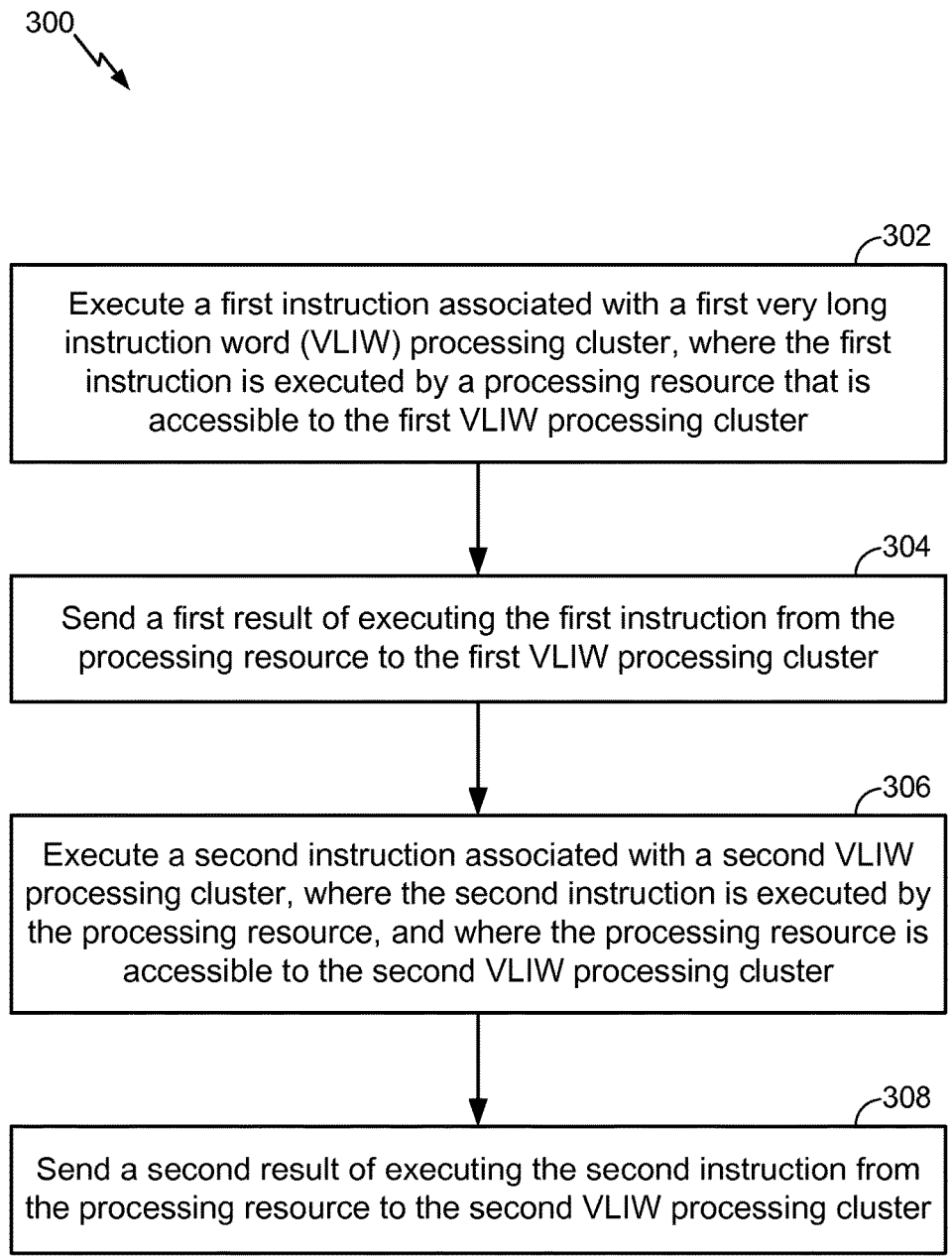
FIG. 3 is a flowchart of a particular illustrative aspect of a method for processing VLIW instruction packets using multiple processing clusters.

Referring to FIG. 3, a flowchart of a particular illustrative aspect of a method 300 for processing very long instruction word (VLIW) instruction packets using multiple processing clusters is shown. The method 300 may be performed at the system 100 of FIG. 1, the processing system 200 of FIG. 2, or any combination thereof.

The method 300 includes executing a first instruction associated with a first very long instruction word (VLIW) processing cluster, at 302. The first instruction may be executed by a processing resource that is accessible to the first VLIW processing cluster. For example, referring to FIG. 2, the first shared arithmetic unit 244 may execute a first instruction associated with the first processing cluster 122 during the first processing cycle. The first instruction may be received by the processing resource from the first VLIW processing cluster.

A first result of executing the first instruction may be sent from the processing resource to the first VLIW processing cluster, at 304. For example, referring to FIG. 2, the result of executing the first instruction may be sent to the first processing cluster 122 via one or more of the data units 248, 250.

A second instruction associated with a second VLIW processing cluster may be executed, at 306. The second instruction may be executed by the same processing resource as the first instruction, and the processing resource is accessible to the second VLIW processing cluster. For example, referring to FIG. 2, the first shared arithmetic unit 244 may execute a second instruction associated with the second processing cluster 126 during the second processing cycle. The second instruction may be received by the processing resource from the second VLIW processing cluster.

A second result of executing the second instruction may be sent from the processing resource to the second VLIW processing cluster, at 308. For example, referring to FIG. 2, the result of executing the second instruction may be sent to the second processing cluster 126 via one or more of the data units 248, 250.

In some circumstances, resource conflicts may occur such that the first shared arithmetic unit 244 is scheduled to execute the first instruction and the second instruction during the same processing cycle. To circumvent such resource conflicts, the method 300 may include identifying a resource conflict by determining that the first instruction and the second instruction are scheduled for execution by the processing resource at the same time. For example, referring to FIG. 2, the inter-cluster scheduling unit 114 may identify the resource conflict. In response to identifying the resource conflict, the method 300 may include rescheduling the second instruction for execution after the first instruction. For example, referring to FIG. 2, the inter-cluster scheduling unit 114 may schedule a third instruction to be executed in parallel with the first instruction and may reschedule the second instruction for execution after the first instruction.

The method 300 of FIG. 3 may reduce die area and power consumption by using shared processing resources 124 that are accessible to multiple processing clusters 122, 126. For example, the shared processing resources 124 may include processing resources that are complex and/or rarely used. Thus, instead of including these complex resources in the first processing cluster 122 and in the second processing cluster 126 (e.g., having multiple complex resources), the complex resources may be shared (e.g., accessible) by each processing cluster 122, 126 to reduce die area.

Figure 4:
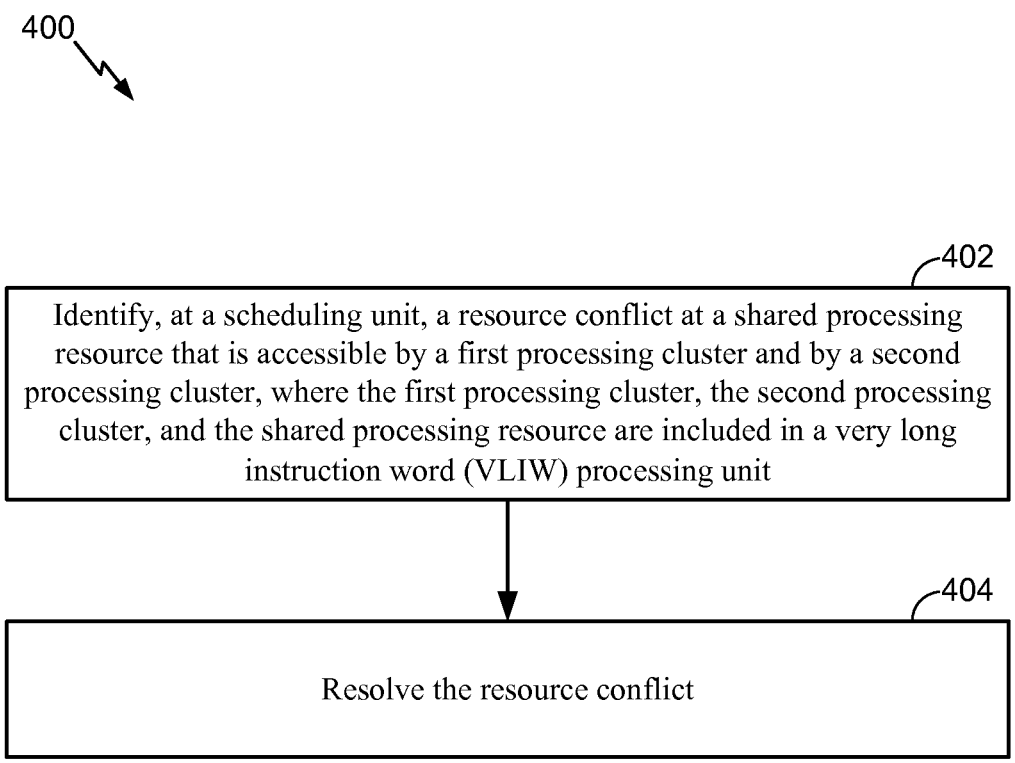
FIG. 4 is a flowchart of another particular illustrative aspect of a method for processing VLIW instruction packets using multiple processing clusters.

Referring to FIG. 4, a flowchart that illustrates a method 400 for processing very long instruction word (VLIW) instruction packets using multiple processing clusters is shown. The method 400 may be performed at the system 100 of FIG. 1, the processing system 200 of FIG. 2, or any combination thereof.

The method 400 includes identifying, at a scheduling unit, a resource conflict at a shared processing resource that is accessible by a first processing cluster and by a second processing cluster, at 402. For example, referring to FIG. 2, the inter-cluster scheduling unit 114 may identify a resource conflict at one of the shared arithmetic units (AUs) 244, 246 accessible by the first processing cluster 122 and the second processing cluster 126. The resource conflict may exist when a first instruction associated with the first processing cluster 122 and a second instruction associated with the second processing cluster 126 are scheduled for concurrent execution by one of the shared AUs 244, 246.

The resource conflict may be resolved, at 404. For example, referring to FIG. 2, the inter-cluster scheduling unit 114 may reschedule the second instruction for execution after the first instruction. In another particular aspect, the inter-cluster scheduling unit 114 may schedule the third VLIW instruction packet 215 for execution in parallel with either the first VLIW instruction packet 211 (e.g., the first instruction) or the second VLIW instruction packet 213 (e.g., the second instruction) in response to identifying the resource conflict. The inter-cluster scheduling unit 114 may schedule the third VLIW instruction packet 215 instead of the fourth VLIW instruction packet 217 in response to determining that the third thread 208 is less recently used than the fourth thread 210.

The method 400 of FIG. 4 may reduce die area and power consumption by using shared processing resources 124 that are accessible to multiple processing clusters 122, 126. For example, the shared processing resources 124 may include processing resources that are complex and/or used infrequently.

Figure 5:
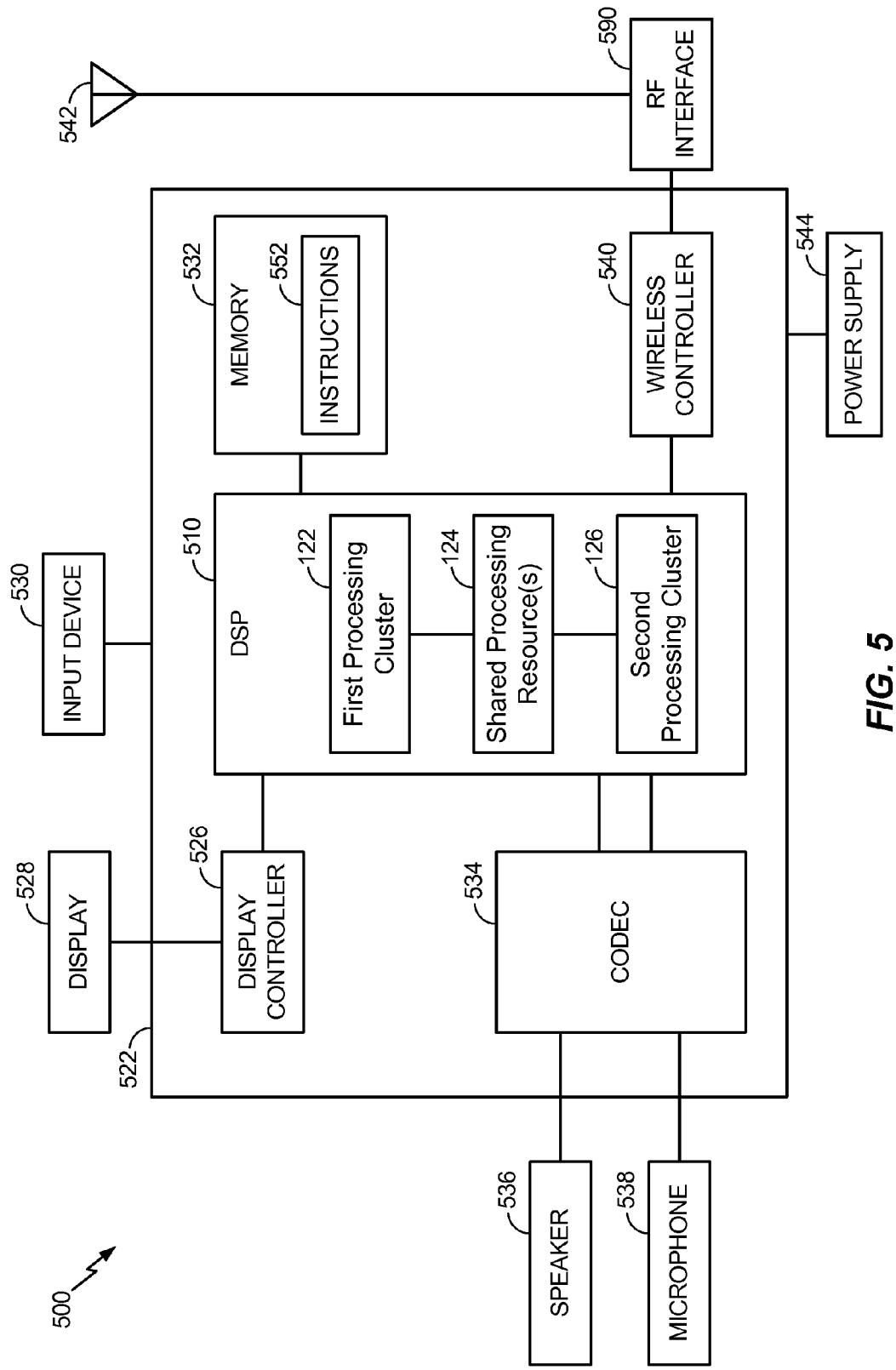
FIG. 5 is a block diagram of a wireless device including a multiple cluster VLIW processing core.

Referring to FIG. 5, a block diagram of a wireless device 500 including a multiple cluster VLIW processing core is shown. The wireless device 500 includes a processor 510, such as a digital signal processor (DSP), coupled to a memory 532.

The memory 532 may be a non-transitory processor-readable storage medium that includes instructions 552. In a particular aspect, the instructions 552 may include multiple VLIW instruction packets, such as the VLIW instruction packets 211, 213, 215, 217 of FIG. 2. The VLIW instruction packets may be executed by a processor, such as the processor 510. The processor 510 may include the system 100 of FIG. 1, the processing system 200 of FIG. 2, or any combination thereof. For example, the processor 510 may include the first processing cluster 122 of FIGS. 1-2, the second processing cluster 126 of FIGS. 1-2, and the one or more shared processing resources 124 of FIGS. 1-2. Components of the processor 510 may be configured to perform the method 300 of FIG. 3, the method 400 of FIG. 4, or any combination thereof. For example, the shared processing resource 124 may execute a first instruction associated with the first processing cluster 122 and a second instruction associated with the second processing cluster 126.

The wireless device 500 may also include a display controller 526 that is coupled to the processor 510 and to a display 528. A coder/decoder (CODEC) 534 can also be coupled to the processor 510. A speaker 536 and a microphone 538 can be coupled to the CODEC 534 and to the processor 510. FIG. 5 also indicates that a wireless controller 540 can be coupled to the processor 510. The wireless controller 540 may also be coupled to an antenna 542 via a radio frequency (RF) interface 590.

In a particular aspect, the processor 510, the display controller 526, the memory 532, the CODEC 534, and the wireless controller 540 are included in a system-in-package or system-on-chip device 522. In a particular aspect, an input device 530 and a power supply 544 are coupled to the system-on-chip device 522. Moreover, in a particular aspect, as illustrated in FIG. 5, the display 528, the input device 530, the speaker 536, the microphone 538, the antenna 542, and the power supply 544 are external to the system-on-chip device 522. However, each of the display 528, the input device 530, the speaker 536, the microphone 538, the antenna 542, and the power supply 544 can be coupled to a component of the system-on-chip device 522, such as an interface or a controller.

In conjunction with the described aspects, an apparatus includes means, within a first very long instruction word (VLIW) processing cluster, for executing a first set of instructions of a first VLIW instruction packet. For example, the means for executing the first set of instructions may include the first cluster forwarding network 228 of FIG. 2, one or more of the arithmetic units 234-240 of FIG. 2, or any combination thereof.

The apparatus also includes means, within a second VLIW processing cluster, for executing a second set of instructions of a second VLIW instruction packet. For example, the means for executing the second set of instructions may include the second cluster forwarding network 262 of FIG. 2, one or more of the arithmetic units 254-260 of FIG. 2, or any combination thereof.

The apparatus may also include means, accessible by the first VLIW processing cluster and by the second VLIW processing cluster, for selectively executing a first instruction of the first set of instructions or a second instruction of the second set of instructions. For example, the means for selectively executing the first instruction or the second instruction may include the one or more shared processing resources 124 of FIGS. 1, 2 and 5, the first shared arithmetic unit 244 of FIG. 2, the second shared arithmetic unit 246 of FIG. 2, or any combination thereof.

The apparatus may also include means for identifying a resource conflict between the first VLIW instruction packet and the second VLIW instruction packet and for scheduling a third VLIW instruction packet for execution in parallel with either the first VLIW instruction packet or the second VLIW instruction packet in response to identifying the resource conflict. For example, the means for identifying the resource conflict and for scheduling the third thread for execution may include the inter-cluster scheduling unit 114 of FIGS. 1-2, the processor 510 of FIG. 5, or any combination thereof.

Those of skill would further appreciate that the various illustrative logical blocks, configurations, modules, circuits, and algorithm steps described in connection with the aspects disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:
1. An apparatus comprising:
a very long instruction word (VLIW) processing unit, wherein the VLIW processing unit includes:
a first processing cluster;
a second processing cluster; and a shared processing resource that is accessible by the first processing cluster and by the second processing cluster;

a control circuit coupled to the VLIW processing unit, the control circuit configured to resolve a resource conflict at the shared processing resource, wherein the resource conflict occurs when a first instruction to be sent by the control circuit to the first processing cluster and a second instruction to be sent by the control circuit to the second processing cluster are scheduled for concurrent execution by the shared processing resource, wherein the control circuit is configured to resolve the resource conflict before each of the first instruction and the second instruction is sent from the control circuit to the VLIW processing unit; and a memory coupled to the VLIW processing unit.

2. The apparatus of claim 1, wherein the shared processing resource includes a shared arithmetic unit, wherein the control circuit further comprises a first dispatch portion and a second dispatch portion, and wherein the first instruction is sent from the control circuit to the first processing cluster via the first dispatch portion and the second instruction is sent from the control circuit to the second processing cluster via the second dispatch portion.

3. The apparatus of claim 2, wherein the first processing cluster includes a first cluster forwarding network, wherein the second processing cluster includes a second cluster forwarding network, and wherein the shared arithmetic unit is coupled to the first cluster forwarding network and to the second cluster forwarding network.

4. The apparatus of claim 2, wherein the first dispatch portion includes a first plurality of ports and the second dispatch portion includes a second plurality of ports, wherein a port of the first plurality of ports provides the first instruction to the first cluster and a port of the second plurality of ports provides the second instruction to the second cluster, and wherein the VLIW processing unit further includes a shared data resource that is accessible by the first processing cluster and by the second processing cluster.

5. The apparatus of claim 4, wherein the shared data resource includes a shared level one (L1) data cache.

6. The apparatus of claim 1, wherein the VLIW processing unit comprises a simultaneous multithreaded (SMT) VLIW processor, and wherein the first processing cluster and the second processing cluster are configured to simultaneously execute instructions.

7. The apparatus of claim 1, wherein the first instruction is included in a first VLIW instruction packet associated with a first thread, and wherein the second instruction is included in a second VLIW instruction packet associated with a second thread.

8. The apparatus of claim 7, wherein the control circuit is further configured to schedule a third VLIW instruction packet associated with a third thread for execution in parallel with either the first VLIW instruction packet or the second VLIW instruction packet in response to identification of the resource conflict.

9. The apparatus of claim 8, wherein the control circuit is further configured to schedule the third VLIW instruction packet instead of a fourth VLIW instruction packet associated with a fourth thread in response to a determination that the third thread is less recently used than the fourth thread.

10. The apparatus of claim 1, wherein the first processing cluster includes a first set of arithmetic units configured to execute first instructions of a first VLIW instruction packet in parallel, and wherein the second processing cluster includes a second set of arithmetic units configured to execute second instructions of a second VLIW instruction packet in parallel.

11. The apparatus of claim 10, wherein the first processing cluster includes a first cluster forwarding network configured to forward the first instructions to the first set of arithmetic units, and wherein the second processing cluster includes a second cluster forwarding network configured to forward the second instructions to the second set of arithmetic units.

12. The apparatus of claim 1, wherein the first processing cluster includes a first register file corresponding to a first thread and a fourth register file corresponding to a fourth thread, and wherein the second processing cluster includes a second register file corresponding to a second thread and a third register file corresponding to a third thread.

13. The apparatus of claim 1, further comprising an instruction cache, wherein the first processing cluster and the second processing cluster are configured to execute instructions retrieved from the instruction cache.

14. The apparatus of claim 13, wherein the VLIW processing unit corresponds to a single VLIW processing core that is configured to access the instruction cache.

15. A method comprising:
identifying, at a control circuit coupled to a very long instruction word (VLIW) processing unit, a resource conflict at a shared processing resource that is accessible by a first processing cluster and by a second processing cluster, wherein the first processing cluster, the second processing cluster, and the shared processing resource are included in the VLIW processing unit, wherein the resource conflict is detected responsive to a first instruction to be sent by the control circuit to the first processing cluster and a second instruction to be sent by the control circuit to the second processing cluster being scheduled for concurrent execution by the shared processing resource; and
resolving the resource conflict; and
after resolving the resource conflict, sending the first instruction and the second instruction.

16. The method of claim 15, wherein resolving the resource conflict comprises rescheduling the second instruction for execution after the first instruction.

17. The method of claim 16, further comprising:
executing the first instruction at the shared processing resource; and
executing the second instruction at the shared processing resource after executing the first instruction.

18. The method of claim 17, further comprising:
sending a first result of executing the first instruction from the shared processing resource to the first processing cluster; and
sending a second result of executing the second instruction from the shared processing resource to the second processing cluster.

19. The method of claim 15, wherein the first instruction is included in a first VLIW instruction packet associated with a first thread, and wherein the second instruction is included in a second VLIW instruction packet associated with a second thread.

20. The method of claim 19, wherein resolving the resource conflict comprises scheduling a third VLIW instruction packet associated with a third thread for execution in parallel with either the first VLIW instruction packet or the second VLIW instruction packet in response to identifying the resource conflict.

21. The method of claim 20, further comprising scheduling the third VLIW instruction packet instead of a fourth VLIW instruction packet associated with a fourth thread in response to determining that the third thread is less recently used than the fourth thread.

22. The method of claim 15, wherein the shared processing resource includes a shared arithmetic unit.

23. A non-transitory computer-readable medium storing very long instruction word (VLIW) instruction packets generated by a compiler, the VLIW instruction packets including indications associated with resource scheduling such that when the VLIW instruction packets are executed by a processor, the indications cause the processor to:

detect a resource conflict, at a control circuit that is coupled to a VLIW processing unit, between a first instruction of a first VLIW instruction packet and a second instruction of a second VLIW instruction packet at a shared processing resource of the VLIW processing unit, wherein the resource conflict is detected responsive to the first instruction to be sent by the control circuit to a first processing cluster of the VLIW processing unit and the second instruction to be sent by the control circuit to a second processing cluster of the VLIW processing unit being scheduled for concurrent execution by the shared processing resource; and resolve the resource conflict; and after the resource conflict is resolved, send the first instruction and the second instruction.

24. The non-transitory computer-readable medium of claim 23, wherein the indications further cause the processor to identify a third instruction of a third VLIW instruction packet for execution in parallel with either the first instruction or the second instruction to resolve the resource conflict.

* * * * *